US007893848B2

(12) United States Patent
Chew

(10) Patent No.: US 7,893,848 B2
(45) Date of Patent: Feb. 22, 2011

(54) APPARATUS AND METHOD FOR LOCATING, IDENTIFYING AND TRACKING VEHICLES IN A PARKING AREA

(75) Inventor: David K. M. Chew, Singapore (SG)

(73) Assignee: Stratech Systems Limited, Singapore (SG)

( * ) Notice: Subject to any disclaimer, the term of this patent is extended or adjusted under 35 U.S.C. 154(b) by 0 days.

(21) Appl. No.: 12/249,166

(22) Filed: Oct. 10, 2008

(65) Prior Publication Data

US 2009/0309760 A1 Dec. 17, 2009

Related U.S. Application Data

(63) Continuation of application No. 11/555,915, filed on Nov. 2, 2006, now abandoned, which is a continuation of application No. 10/933,585, filed on Sep. 3, 2004, now abandoned.

(30) Foreign Application Priority Data

Sep. 3, 2003 (SG) ............................ 200305650-4

(51) Int. Cl.
*B60Q 1/48* (2006.01)
*G08G 1/14* (2006.01)

(52) U.S. Cl. ...................................... 340/932.2; 701/25

(58) Field of Classification Search ............. 340/932.2, 340/933; 701/25, 28, 208, 211
See application file for complete search history.

(56) References Cited

U.S. PATENT DOCUMENTS 6,340,935 B1 * 1/2002 Hall ........................ 340/932.2
6,426,708 B1 * 7/2002 Trajkovic et al. ......... 340/932.2
6,662,077 B2 * 12/2003 Haag ....................... 340/932.2
6,747,687 B1 * 6/2004 Alves ....................... 340/932.2
6,750,786 B1 * 6/2004 Racunas, Jr. ............. 340/932.2
6,816,085 B1 * 11/2004 Haynes et al. ........... 340/932.2
6,924,749 B2 * 8/2005 Nelson et al. ............ 340/932.2
6,946,974 B1 * 9/2005 Racunas Jr. .............. 340/932.2
6,970,101 B1 * 11/2005 Squire et al. ............. 340/932.2
7,026,954 B2 * 4/2006 Slemmer et al. ......... 340/932.2
2002/0171562 A1 11/2002 Muraki
2003/0133594 A1 * 7/2003 Sefton ........................ 382/103

FOREIGN PATENT DOCUMENTS

JP H07-167186 1/1997
JP H07-212038 3/1997
JP 2000172993 6/2000
JP 2001266296 9/2001
JP 2002117493 4/2002
JP 2003058925 2/2003

OTHER PUBLICATIONS

Official Notice Of Reason For Refusal for Japanese Patent Application No. 2006-525309, dated Jun. 29, 2010, 7 pages.
Taiwanese patent application No. 093126673, Search Report issued Oct. 11, 2010, 5 pages.

* cited by examiner

*Primary Examiner*—John A Tweel, Jr.
(74) *Attorney, Agent, or Firm*—Conley Rose, P.C.

(57) ABSTRACT

A method for use in the management of vehicle parking in a vehicle parking area having a plurality of vehicle parking spaces, the method comprising determining the locations of vacant vehicle parking spaces; and displaying the locations of vacant vehicle parking spaces to people seeking to park vehicles.

16 Claims, 4 Drawing Sheets

APPARATUS AND METHOD FOR LOCATING, IDENTIFYING AND TRACKING VEHICLES IN A PARKING AREA

The present application is a continuation of U.S. application Ser. No. 11/555,915 filed on 2 Nov. 2006 now abandoned. The U.S. application Ser. No. 11/555,915 is a continuation of U.S. application Ser. No. 10/933, 585 filed on 3 Sep. 2004 now abandoned. The U.S. application Ser. No. 10/933, 585 claims benefit of priority from Singapore application No. 200305650-4 filed on 3 Sep. 2003.

FIELD OF THE INVENTION

The invention relates to vehicle parking. In particular, it relates to apparatus and method for locating, identifying and tracking vehicles in a car park.

BACKGROUND

A driver encounters many problems while parking vehicles in a huge car park. For instance, in a crowded huge multi-story car park, it is difficult for a driver to remember where his/her vehicle is parked. Often it is a frustrating experience to search for his/her vehicle. Quite often, it is difficult for a driver to locate an empty parking space to park his/her vehicle in a huge car park, despite being informed that numerous parking spaces are available. Precious time is wasted by drivers when he/she cannot remember where the vehicle is parked or not being in a position to trace an empty parking space. The present car parking systems are not efficient enough for a car park operator to ease the problems mentioned above. Slow vehicle retrieval and delay in searching for empty lots results in problems, such as delayed exit of vehicles, increased car park jams, less effective parking capacity, and poor car park utilisation. Furthermore, motorists are at great inconvenience, and may even result in discouraging others from parking in such car parks. For the car park operators, these problems translate directly to revenue loss. This in turn, reduces the revenue of the shop keepers or businessmen who are present in a building having such a car park.

Presently, some car parks have addressed the above problems to some extent. Some car parks provide empty lot information. For example, a car park is divided into many different zones and vehicle detection sensors are installed between each zone to count the numbers of vehicles coming in and going out of a zone. These vehicle sensors provide information to derive the number of vehicles parked inside each zone. Other systems involve the installation of vehicle detection sensors (infra red, proximity, or light sensors, etc) for each parking lot, thus providing parking lot availability information. However, the existing car park systems have many drawbacks, including inability to determine when specific lots become available, high infrastructural costs, high per car park lot equipment, high installation and maintenance costs. Moreover, existing methods are based on the principle of counting of vehicles or the occupation of lots.

SUMMARY OF THE INVENTION

In accordance with a first aspect of the present invention, there is provided a method for use in the management of vehicle parking in a vehicle parking area having a plurality of vehicle parking spaces. The method comprises determining the locations of vacant vehicle parking spaces and displaying the locations of vacant vehicle parking spaces to people seeking to park vehicles.

In accordance with a second aspect of the present invention, there is provided a method for use in the management of vehicle parking in a vehicle parking area having a plurality of vehicle parking spaces. The method comprises determining one or more identifying features of each of a plurality of vehicles located in vehicle parking spaces, receiving a request to locate a specific vehicle with at least one of said one or more identifying features, determining one or more possible locations for said specific vehicle based on said at least one of said one or more identifying features and the determined one or more identifying features of each of a plurality of vehicles, and displaying said one or more possible locations in response to said request. The one or more identifying features may comprise one or more of: the number plate, the color, the make and the model of a vehicle.

In accordance with a third aspect of the present invention, there is provided a system for use in the management of vehicle parking in a vehicle parking area having a plurality of vehicle parking spaces. The apparatus comprises a detection unit for determining the locations of vacant vehicle parking spaces and a display unit. The display unit displays the locations of vacant vehicle parking spaces to people seeking to park vehicles. The detection unit may comprise a plurality of camera elements and an image processing unit for processing images obtained by the camera elements, each camera element surveying one or more of the vehicle parking spaces. Each camera element may be arranged such that different cells of an image from the camera element is associated with one vehicle parking space, and the image processing determines the location of the vacant vehicle spaces based on individual cells of the images. The display unit may comprise one or more audio display devices and/or one or more visual display devices. The display unit may be arranged to communicate with one or more remote devices for facilitating displaying the locations of the vacant parking spaces. The remote devices may comprise on-vehicle devices.

In accordance with a fourth aspect of the present invention, there is provided a system for use in the management of vehicle parking in a vehicle parking area having a plurality of vehicle parking spaces. The apparatus comprises a first detection unit for determining one or more identifying features of each of a plurality of vehicles located in vehicle parking spaces, an interface unit for receiving a request to locate a specific vehicle with at least one of said one or more identifying features, a processing unit for determining one or more possible locations for said specific vehicle based on said at least one of said one or more identifying features and the determined one or more identifying features of each of a plurality of vehicles, and a display unit for displaying said one or more possible locations in response to said request. The system may further comprise a second detection unit for determining the locations of vacant vehicle parking spaces. The display unit further displays the locations of vacant vehicle parking spaces to people seeking to park vehicles. The first and second detection units may be implemented in a single detection unit. The one or more identifying features may comprise one or more of: the number plate, the color, the make and the model of a vehicle. The first and/or second detection units may comprise a plurality of camera elements and an image processing unit for processing images obtained by the camera elements, each camera element surveying one or more of the vehicle parking spaces. Each camera element may be arranged such that different cells of an image from the camera element is associated with one vehicle parking space, and the image processing determines the location of the vacant vehicle spaces based on individual cells of the images. The display unit may comprise one or more audio display devices and/or one or more visual display devices. The display unit may be arranged to communicate with one or more remote devices for facilitating displaying the locations of the vacant parking spaces. The remote devices may comprise on-vehicle devices.

In accordance with a fifth aspect of the present invention, there is provided a method for automatically providing the occupancy status of specific, individual car park spaces, and identifying the vehicles that occupy them. The method comprises processing one or more images of the car park spaces to provide information regarding the locations and numbers of empty and occupied car park spaces, and guidance information to their locations and processing one or more images of the vehicles occupying car park spaces, to identify one or more of their features, thereby to enable the accurate locating of the vehicles, and to provide guidance information to their locations. Processing one or more images of the vehicles occupying car park spaces may comprise processing said images of the vehicles to determine one or more of: the number plate, the color, the make and the model of the vehicle in each image.

In accordance with a sixth aspect of the present invention there is provided a computer readable data storage medium having stored thereon computer code means for instructing a computer to execute a method for use in the management of vehicle parking in a vehicle parking area having a plurality of vehicle parking spaces. The method comprises determining the locations of vacant vehicle parking spaces and displaying the locations of vacant vehicle parking spaces to people seeking to park vehicles.

In accordance with a seventh aspect of the present invention, there is provided a computer readable data storage medium having stored thereon computer code means for instructing a computer to execute a method for use in the management of vehicle parking in a vehicle parking area having a plurality of vehicle parking spaces. The method comprises determining one or more identifying features of each of a plurality of vehicles located in vehicle parking spaces, receiving a request to locate a specific vehicle with at least one of said one or more identifying features, determining one or more possible locations for said specific vehicle based on said at least one of said one or more identifying features and the determined one or more identifying features of each of a plurality of vehicles, and displaying said one or more possible locations in response to said request.

In accordance with an eighth aspect of the present invention, there is provided a computer readable data storage medium having stored thereon computer code means for instructing a computer to execute a method for automatically providing the occupancy status of specific, individual car park spaces, and identifying the vehicles that occupy them. The code comprises processing one or more images of the car park spaces to provide information regarding the locations and numbers of empty and occupied car park spaces, and guidance information to their locations, and processing one or more images of the vehicles occupying car park spaces, to identify one or more of their features, thereby to enable the accurate locating of the vehicles, and to provide guidance information to their locations.

BRIEF DESCRIPTION OF THE DRAWINGS

The invention is further described by way of non-limitative examples, with reference to the accompanying drawings, in which.

DETAILED DESCRIPTION

Figure 1:
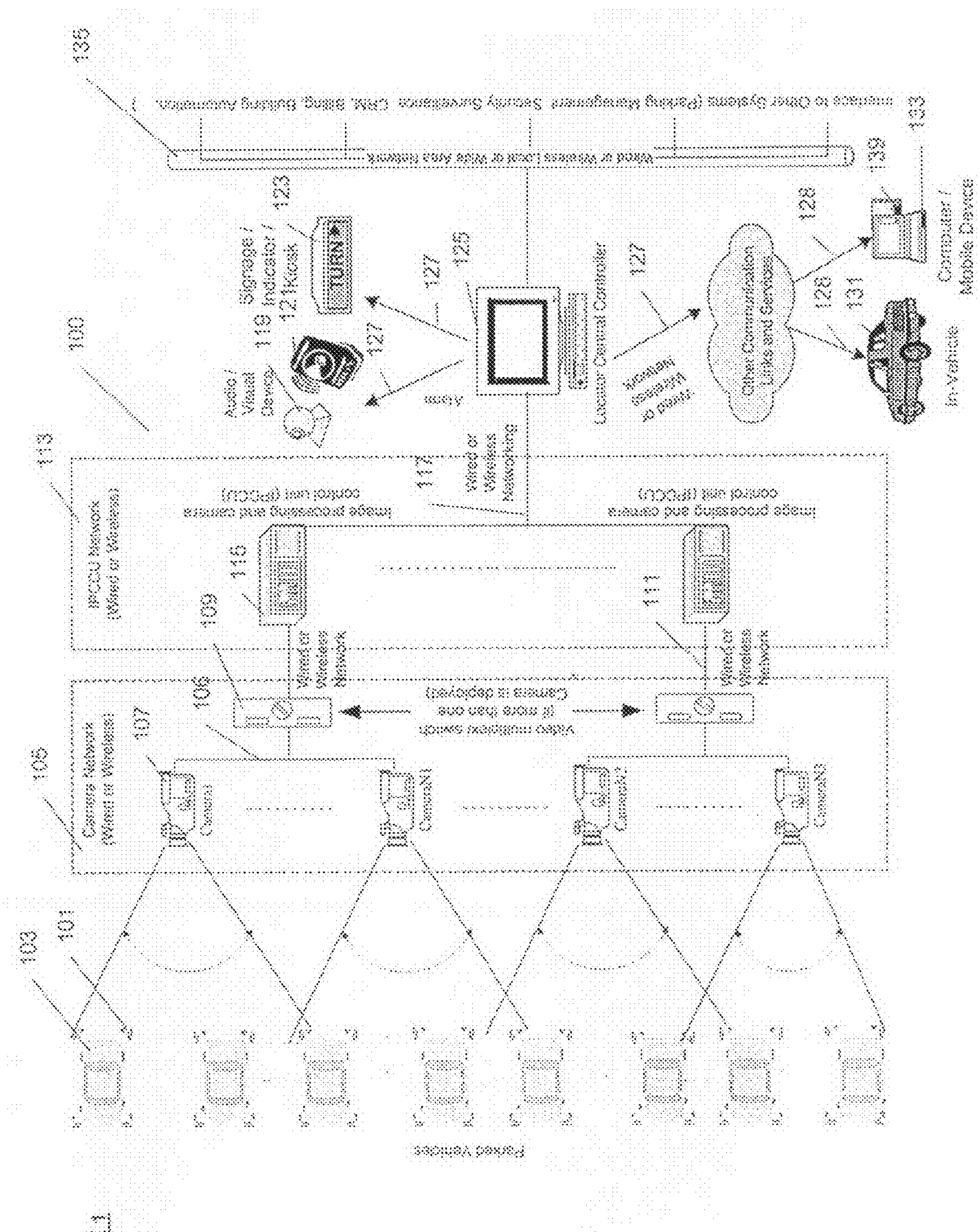
FIG. 1 shows a System Concept Diagram of an embodiment of the invention.

The System Concept Diagram 100 of an embodiment of the invention is presented in FIG. 1. The embodiment of the invention describes an apparatus and method for automatically providing the occupancy status of specific, individual car park lots 101 or spaces, and identifying each of the vehicles 103 that occupy them. The provision of occupancy status of the car park lots 101 is achieved by processing one or more images of the car park lots 101 to provide information regarding the locations and numbers of empty and occupied car park lots 101, and guidance information to locate the car park lots 101. The identification of vehicles 103 is achieved by processing one or more images of the vehicles 103, which may include identifying the license plate (i.e., a series of number and/or characters) of vehicles 103, providing the accurate location (e.g., in which car park lot and where is that lot within the entire car park) of vehicles 103 by identifying by one or more of their features (e.g. colour, model, brand etc of a car), and providing guidance information to locate the vehicles 103. The apparatus and method can be extended to provide vehicle-related information, such as parking lot booking/reservation, parking enforcement, car park surveillance, vehicle look-up, traffic flow analysis, and congestion regulation.

A camera network 105 having a plurality of cameras 107 is installed inside and/or outside of a vehicle parking facility to monitor continuously some or all of the parking lots 101 and/or vehicle lanes for the presence/absence and movement of objects, people and vehicles 103. The camera network 105 may be wired or wireless 106.

The images acquired by the camera sensor network 105 are transmitted through wired or wireless network 111 to a network of Image Processing and Camera Control Units (IPCCUs) 113 via an array of video multiplexes/switches 109. The IPCCUs network 113 comprises a plurality discrete IPCCUs 115 each of which may be assigned to process the images from the camera network 105. Each of the IPCCUs 115 process the images that are channeled to them using built-in advanced adaptive self-learning image-processing algorithms that are stored in the memory of the IPCCU 115. These algorithms deduce the status of the car park, and transmit the car park status through wired or wireless network 117 to the Locator Central Controller 125.

Apart from the IPCCUs 115, the image-processing algorithms may also be located in the locator central controller 125, the video multiplex/switch 109 or camera units 107. However, a typical design will involve placing most (if not all) of the image processing algorithms (e.g. those for car park lot status determination and vehicle image acquisition and feature processing) at the IPCCUs 115. In some cases, the central controller 125 may also host certain image processing algorithms. The IPCCU 115 and central controller 125 could be provided in the same machine.

Given the car park status from the IPCCUs 115, the central controller 125 facilitates value-added services and extends them to the users, which include, but not limited to, car park customers, operators and owners. To deliver these services to the users, the locator central controller 125 uses a variety of means to interact with the users and/or external systems. These interactive means include, but not limited to, in-vehicle units 131, audio devices 121, video devices 119, mobile devices 139, computers 133, LED panels, plasma display panels, and signage 123, located e.g. at a junction within the car park, or at a self-service kiosk. The signage 123 may guide a driver in the direction of empty parking lots. The communication between the locator central controller 125 and external interactive means may be wired or wireless 127, 128.

Figure 2:
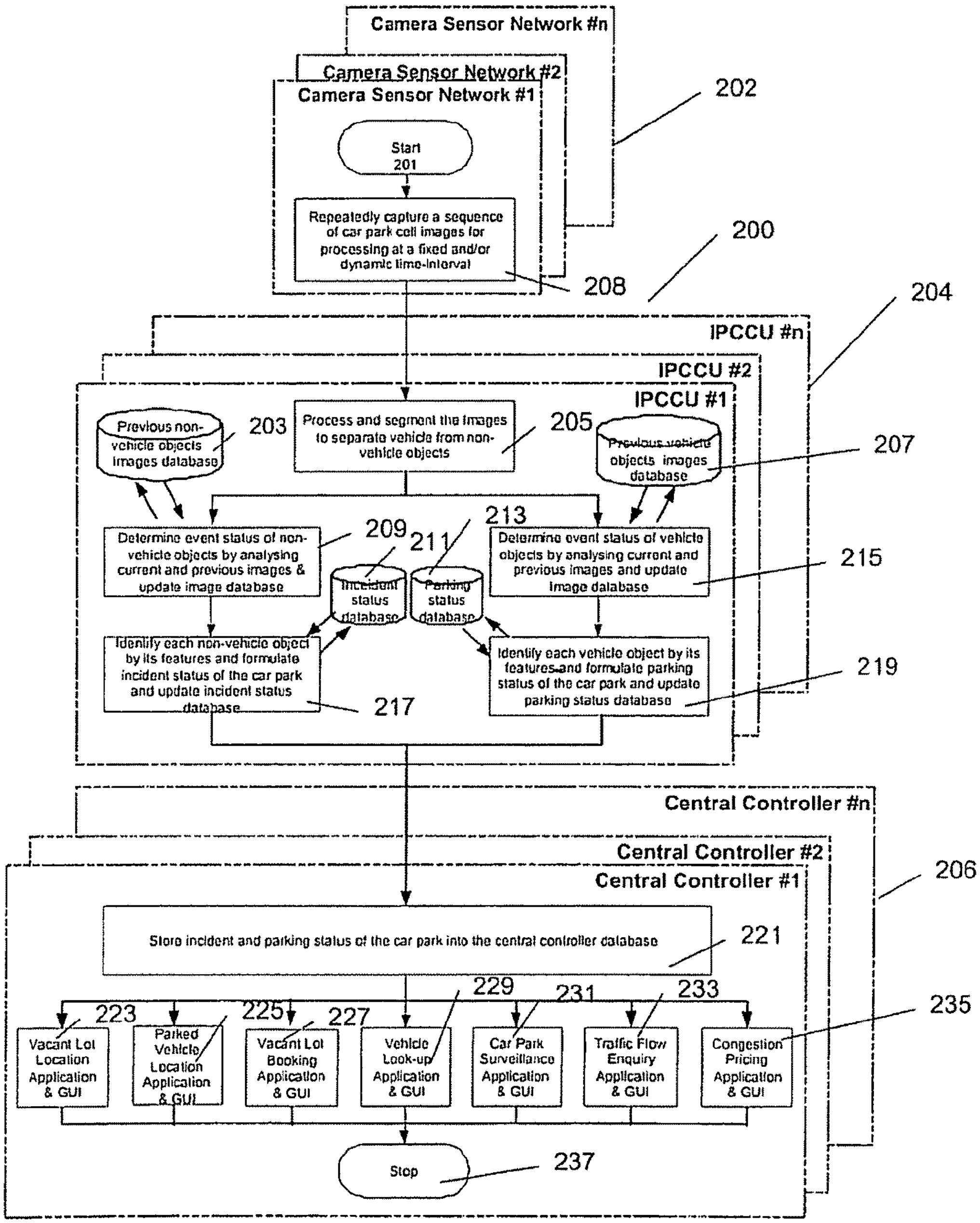
FIG. 2 shows an example embodiment of a high level process flow diagram for use with the embodiment shown in FIG. 1.

A High Level Process Flow Diagram 200 of an example embodiment of the invention is presented in FIG. 2. The flow diagram 200 comprises three basic blocks, namely a camera sensor network 202, an image processing and camera control unit 204, and a central controller 206. The process flow starts at step 201. At step 208, a camera sensor from a plurality of camera sensor network 202 in a car park repeatedly captures a sequence of a respective car park cell images. The captured cell images are sent for processing at a respective IPCCU from a plurality of IPCCUs 204, the processing being done at fixed or dynamic time intervals. At the IPCCUs 204, images received at step 205 are processed and segmented into vehicle and non-vehicle objects.

At step 209, the non-vehicle objects are further processed to determine the event status by analysing the current and previous images and the image database is updated. Previous non-vehicle object databases are stored and retrieved at step 203. Incident status database are stored and retrieved at step 211. At step 217, each of the non-vehicle object is identified by its features and the incident status of the car park is formulated and updated in the database.

At step 215, the vehicle objects are further processed to determine the event status by analysing the current and previous images and the image database is updated. Previous vehicle object databases are stored and retrieved at step 207. Parking status database are stored and retrieved at step 213. At step 219, each of the vehicle object is identified by its features and the parking status of the car park is formulated and updated in the database.

The combined output from step 217 (details of the incident status) and 219 (details of parking status) are channelled to a respective central controller (of a plurality of central controllers 206) and are stored in a respective central controller at step 221.

From the data stored at step 221, services, such as vacant lot location application 223, parked vehicle location application 225, vacant lot booking application 227, vehicle look-up application 229, car park surveillance application 231, traffic flow enquiry application 233, congestion pricing application 235, etc are made available on a respective graphic user interface (GUI). At step 237, the processing is terminated.

Figure 3:
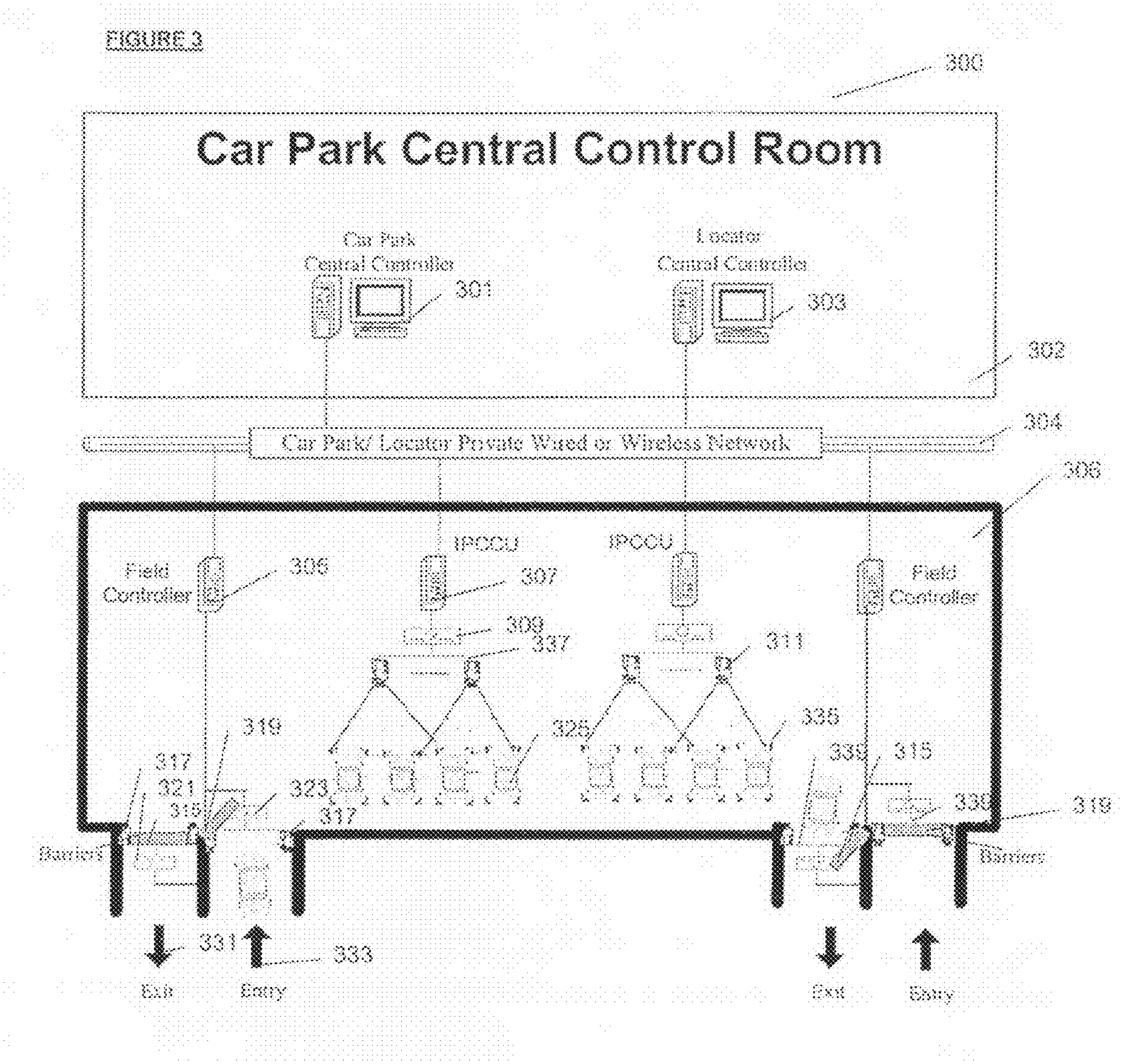
FIG. 3 illustrates an example embodiment of the invention complementing an integrated deployment of a Car Park System.

The above embodiment of the invention, besides being deployed as a standalone system, can be used to complement a car park system. FIG. 3 shows an example embodiment of an integrated deployment system 300.

The car park system 300, regulates vehicles 325 entering and leaving parking facility 306 by charging the users a parking fee. In order to provide supplemental value added services to the drivers and the car park operators, the system 300 is deployed in parallel with the car park system 100 described in the above embodiment. Supplemental services include but not limited to, vacant lots locating, parked vehicles locating, vacant lots reservation, vehicle safety surveillance, illegal parking enforcement, parked vehicle look-up, traffic flow forecast, and congestion control.

In the example embodiment of the integrated deployment system 300, a field controller 305 and IPCCUs 307 are shown to be independently deployed. Alternatively, the field controller 305 and the IPCCU 307 can be integral. The integrated car park system in the example embodiment uses separate network of cameras 311, 317 to identify vehicles. Alternatively the car park system 100 as described above and the integrated deployment system 300 can potentially share the same cameras network.

A vehicle 325 enters the car park at entry points 333 and exits the car park at exit points 331. The entry point has a barrier 319 to block vehicles before entering the car park 306. Similarly, the exit point has a barrier 315 to block vehicles before exiting the car park 306.

The field controller 305 controls the opening and closing of the barriers 315, 319 depending on whether payment for parking was done before a vehicle exits the car park.

The field controllers 305, IPCCUs 307 and central controllers 301, 303 are typically located in a car park central control room 302. The communication between the field controllers 305, IPCCUs 307 and central controllers is through a common private communication network 304. This network 304 can be either wired such as, but not limited to, LAN and Serial, or wireless such as, but not limited to, wireless LAN 802.11a. The communication between the cameras 311 mounted inside the car park may be wired or wireless 337, whilst the communication between the cameras 317 mounted outside the car park may be wired or wireless 339.

The car park central controller 301 regulates the entry and exit of vehicles 325, and the locator central controller 303 tracks and monitors the vehicles 325 while they are within the car park premises 306. Although the car park central controller 301 and the locator central controller 303 is shown to be standalone and independent systems, in case the car park central controller 301 is a microprocessor-based system, the two central controllers 301, 303 can share the same microprocessor-based system i.e. the controllers 301, 303 can be integral.

The embodiment of the invention employs computer vision and information technology to detect and analyse events inside and outside car parks 306 which, in turn, activates sub-systems based on the analysis to provide value-added services to the customers, operators and owners of car parks.

Cameras 311,317 are respectively mounted on the inside and outside of a car park premises 306. The car park 306 is divided into an array of physically labeled cells for monitoring and identification purposes. Each car park cell, at any given time, may contain objects, people and/or vehicles 325. Each cell is being monitored and analysed repeatedly at a pre-defined time interval for one or more event status. These event status for vehicles parking, include, but not limited to, lot-vacant, lot-occupied, lot-in-transit, no-vehicle, vehicle-towards, vehicle-away, and vehicle-stop. The event status for car park surveillance, include, but not limited to, no-human, human-towards, human-away, crowd-towards, crowd-away, and crowd-stop.

Given the event status related to vehicle parking being defined continuously by the IPCCU 307 for each car park cell, the real-time parking status of the entire car park can be derived and stored in the database of the central controller 301, 303. This information of the car park status is updated on a regular time interval to facilitate accurate retrieval of information when needed.

Status related to vehicles parking includes, but not limited to,

1. Number of vacant lots in the car park

2. Location of a vacant lot by its lot ID

3. Location of a parked vehicle by its unique features

4. Congestion level at a particular car park cell

Status related to car park surveillance includes, but not limited to:

1. Alert level of a particular car park cell based on density and pattern of movement 2. Alert level of a particular parked vehicle based on unusual movement pattern around the vehicle With the above status parameters defined in real-time, the following services of the embodiment of the invention can be deployed:

1. Parking vacancy locating system to assist the drivers to identify and locate vacant lots 2. Parked vehicle locating system to assist the drivers to identify and locate their parked vehicles 3. Parking reservation system to allow remote booking of vacant parking lots 4. Parking enforcement system to prevent illegal parking or use of facility 5. Intelligent car park surveillance system to detect unusual events in the car park, for example: noticeable sweating, loitering, fidgeting movements, damaging vehicles, etc.

6. Graphical vehicle search system for visual identification of vehicles

7. Traffic flow analysis system to broadcast congested areas within the car park premise 8. Congestion pricing system for balancing the utilisation of the car park To deliver the above services to the users, one of more of the following information disseminating techniques can be employed:

1. In-vehicle information devices via wireless communication

2. Mobile devices such as PDA and mobile phones via wireless communication

3. Desktop and lap top computer systems over Intranet and Internet

4. Roadside and in-building infrastructure such as LED panels and plasma screens 5. Auto-pay stations and self-service kiosks via LAN 6. Car park attendants and customer service representatives over the counter The cameras 311 can be used for surveillance, e.g. for detecting abnormal movement of people or anything from the list of unusual events mentioned above. For example, if a person were found loitering in any particular area for more than a certain period of time, a PTZ (Pan Tilt Zoom) camera would automatically zoom in to capture an image of the person and alert the relevant authorities. The system can also store the image for further reference. This would help in apprehending suspicious characters and to reduce car theft and vandalism.

Main components of the above example embodiment are listed below:

1. Camera Sensor Network

A single or network of cameras 311, 317 to monitor a region of interest inside and/or outside of a car park 306 and to provide the features mentioned above.

The camera sensor network provides image/data acquisition by cameras 311, 317 installed to cover one or more car park lots 335. Some cameras 311, 317 are installed for_monitoring the lanes or other non-parking areas within the car park to provide value added services mentioned above.

For multi-cameras deployment, at least one video switches/multiplexers 309, 321, 323 is required to channel the images to the IPCCUs 307. For single camera deployment, images can be streamed directly to the IPCCU 307 or the Central Controllers 301, 303. In the case of single camera deployment the use of, video switch/multiplexer 309, 321, 323 becomes optional.

Some or all the cameras 311, 317 can be mounted on PTZ platforms, if necessary. The means to control these PTZ platforms may be a function of the cameras if the cameras are equipped with embedded microprocessors, or can be remotely controlled by the IPCCUs 307.

Cameras 311, 317_built-in with an embedded microprocessor, can be dynamically programmed to pre-evaluate the quality of each image taken, and intelligently adjust the PTZ to obtain additional images until an image with acceptable quality is found. If no acceptable image is obtained after a predefined period of time, the system proceeds to the next task and a notification is activated to prompt the operator for appropriate action.

Some or all cameras 311, 317 can be high-performance cameras that are capable of monitoring the region of interest with some or none of the PTZ functions.

Apart from cameras, it is possible to include other sensors in the system. The camera may also be network compatible, such that it can be interfaced directly to the IPCCU 307 or central controllers 301, 303 via e.g. an IP network 304.

The connection from the cameras 311, 317 to the switches/multiplexers 309, 321, 323, and from the switches/multiplexers 309, 321, 323 to IPCCUs 307 can be either wired, or wireless 337, 339.

2. Image Processing and Camera Control Unit (IPCCU)

A microprocessor-based system converts the images transmitted from the video switches/multiplexers 309, 321, 323 directly from the cameras 311, 317, and implements the primary features mentioned above.

For each switch/multiplexer 309, 321, 323, one IPCCUs 307 is be needed to process the images and channel the outcomes to the Central Controller 301, 303 of the embodiment of the invention. If no switch/multiplexer 309, 321, 323 is deployed, the images will be channeled directly from the cameras to either the IPCCU 307 or the Central Controller 301, 303. In the latter case, the Central Controller 301, 303 assumes the role of the IPCCU 307.

Each IPCCU 307 employs proprietary advanced adaptive self-learning image processing algorithms to perform real-time identification/classification/location of vehicles 325, and real-time detection/location of vacant/occupied parking lots 335. The system also determines the identity of the vehicle at each occupied parking lot 335.

If the cameras 311, 317 are mounted on a PTZ platform do not have embedded microprocessors, the IPCCU 307 assumes the role of controlling the PTZ platform.

If the cameras 311, 317 or video switches/multiplexers 309, 321, 323 have built-in embedded microprocessors, the embedded microprocessors could potentially perform the processing functions of the IPCCU 307. In such case, there is no need for IPCCU 307.

IPCCUs 307 communicates with the Central Controller 301, 303 through either a wired, or a wireless network 304.

Possible networks 304 include, but not limited to, Local Area Network (LAN), Wide Area Network (WAN), Wireless LAN 802.11a, and WIFI 802.11b.

3. Central Controller 301, 303

A microprocessor-based system that accepts information from the IPCCUs as input, re-configures the information, and implements secondary and other features of the example embodiment. There can be more than one central controller 301, 303 in a system.

The central controller 301, 303 in the example embodiment employs proprietary advanced software engineering to implement software applications that allow the users to locate vacant lots, locate parked vehicles, book vacant lots, enforce parking rules, detect incidents, look-up parked vehicles, analyse traffic flow, and regulate car park utilisation.

For the purpose of exchanging information with the users, central controller 301, 303 can be built with interface for devices such as, but not limited to, in-vehicle units 131, audio devices 121, video devices 119, mobile devices 139, computers 133, LED panels, plasma display panels, and self-service kiosk 123. The communication between the central controllers 301,303 and the devices can be either wired or wireless.

To enable the connection with external devices and systems, central controller can be equipped with communication channels such as, but not limited to, serial ports, parallel ports, Universal Serial Buses (USB), leased lines, Integrated Services Digital Network (ISDN), Local Area Network (LAN), and Wide Area Network (WAN). The central controller could also host web services for a user to access the stated service via the Internet.

As an alternative to vacant lot 335 detection, it may be, for example, possible to use light sensors installed at each lot 335 to detect the present of vehicle at the lot 335, or induction loop sensors embedded under the surface of the flooring to count vehicles 325 entering and leaving a parking zone.

Secondary components of an embodiment of the invention are listed below:

1. In-Vehicle Units (TUs) 131 and On-board Units (OBUs) for accessing incident and parking status 2. Computer terminals 133 and Self-service Kiosks 123 for accessing incident and parking status 3. Hand-held mobile devices 139 such as, but not limited to mobile phones and PDAs for accessing incident and parking status 4. Roadside display medium such as, but not limited to LED and plasma-display panels for disseminating incident and parking status 5. Audio and Visual devices 119, 121 for generating alerts based on incident and parking status 6. Other IT systems such as, but not limited to web server, modems, leased lines, hubs, switches, routers and appliances that help disseminating incident and parking status to the general public.

The invention, as embodied can locate a vehicle by its visual features (i.e., not requiring to place any identification tag or label on any part of the vehicle) including possibly its license plate identifier (i.e., a series of number and/or characters), and map it to a specific location including possibly a particular parking lot inside or outside of a car park.

Although the above embodiment relates to use of the invention in a car park, the present invention may also have other applications, including in the monitoring, verification, and enforcement of street parking.

In case of the application to street parking, an example embodiment may have cameras strategically located at buildings or other high vantage points along the street to monitor parking lots along the street. These cameras provide real-time information on vacant and occupied lots along the street, similar to those provided for car parks in a building or open air. For example, if a driver is looking for an empty lot to park his car, a display board can inform him whether there is any vacant lot in the side road before he turns into it.

As a driver is about to reverse into a parking lot, the camera detects this phenomenon and triggers a PTZ camera to capture the license plate of the vehicle. After the car is properly parked, the system will capture the time, which will be the commencement of parking fee. Similarly, when a car is about to leave a parking lot, this phenomenon is noticed by the scanning camera and the PTZ camera is activated to monitor the event and captures the time that the car leaves the parking lot.

Payment of parking charges can be through cash card, where a booth can be positioned at the driver's side of the road for him to insert the cash card into a reader. Alternatively, if the city has implemented Electronic Toll Collection for use of its roads and highways, a similar device can be triggered by the camera system to deduct the parking charges.

There will also be information kiosks conveniently located along the streets for the drivers to enquire about the location where he has parked his car, and how much parking charge has been incurred before he reaches to his/her car.

The primary usage of the information from an example embodiment of the invention may be for real-time identification or classification of vehicles, locating of the vehicles within the car park premises, and enabling the look-up of vehicles based on a set of search criteria.

The basic functionality of the example embodiment described include:

| | |
|---|---|
| Real-time identification/ classification of vehicles | Real-time identification of vehicles by one or more features (e.g. model label, colour, contour, size) obtained through the processing of one or more images of the vehicles in real-time, which may include their license plate identifier (i.e., a series of number and/or characters). By associating the features with a set of predefined classification information, the class of the vehicles can be derived. |
| Real-time detection of vehicle-presence at a predefined location within the premise of a car park | Real-time detection of vehicle-presence at a predefined location within the premises of a car park by processing one or more images of the predefined location. The predefined locations can be labeled car park lots within the car park. In such case, the number of empty and occupied lots within the car park at any given time can be determined. |
| Real-time looking-up of vehicles within the premise of a car park | Real-time mapping of identified and/or classified vehicles to predefined locations detected with vehicle-presence. With this mapping, vehicles within the car park premise can be located based on a fully or partially matched set of search criteria. This set of search criteria shall consist of the features of the vehicles, which may include their license plate identifier (i.e., a series of number and/or characters). |

Other usage of the information from the described embodiment may be for parking lot booking/reservation, parking and vehicle locating guidance, and illegal parking enforcement.

Further features of the example embodiment of the invention may include:

| | |
|---|---|
| Real-time parking lot booking/ reservation service | Real-time parking lot booking/reservation service can be provided to users through various possible customer service channels, including telephone, mobile phone, internet, kiosk, SMS, etc. |
| Real-time parked vehicle locating guidance service | Knowing the location of the enquiry source and the location of the vehicle, a predefined set of directional instructions can be provided to show the best way from the location of the inquiry source to the location of the vehicle. This can be accomplished through the use of information dissemination means such as electronic signage. |
| Real-time vacant parking lot locating guidance service | Knowing the location of entrances to the car park as well as the vacant lots' location, directional instructions can be provided for users to locate an available, booked or reserved lot. This can be accomplished through the use of an information dissemination means such as electronic signage. |
| Real-time illegal parking enforcement service | By mapping the vehicle to their parking location, the policy of reserved parking can be managed and enforced. |

Yet other features of an example embodiment may include several value-added services, including:

| | |
|---|---|
| Intelligent surveillance of car park for effective management of incidents within the car park premise | Monitor the objects, people and vehicles at a predefined location within a car park premise, and apply advanced image-processing algorithms to intelligently analyse the activities at that location to detect incidents such as abnormal events, crimes, vehicle breakdowns, call-for-help, or suspicious behaviours. |
| Display and indexing of live car park images for efficient look-up of vehicles | Display graphical live car park images that is linked to the digital map of the car park to assist the users, such as the driver, the customer service personnel, the valet service attendance, security officer, or others, to visually locate and identify the vehicle of interest. |
| Broadcasting of car park's traffic flow condition for easing of traffic congestion within the car park | Broadcast the traffic flow conditions inside the car park by means of signage and/or other visual indicators to the users. These include indicating congested lanes (paths or routes) within the car park along which vehicles searching for lots or exiting the car park may take. This is based on the images and visual information produced by the cameras and image processing programs. This information may also be a result of data from other subsystems or sensors. This value-add feature can be used together with Secondary Feature #3. |
| Strategic charging and guidance of parking vehicles for effective utilisation of car park lots. | Apply differential parking charges to vehicles based on their parked locations, and/or strategically direct in-coming vehicles to less popular car park locations so that parked vehicles are effectively distributed across the car park. |

Figure 4:
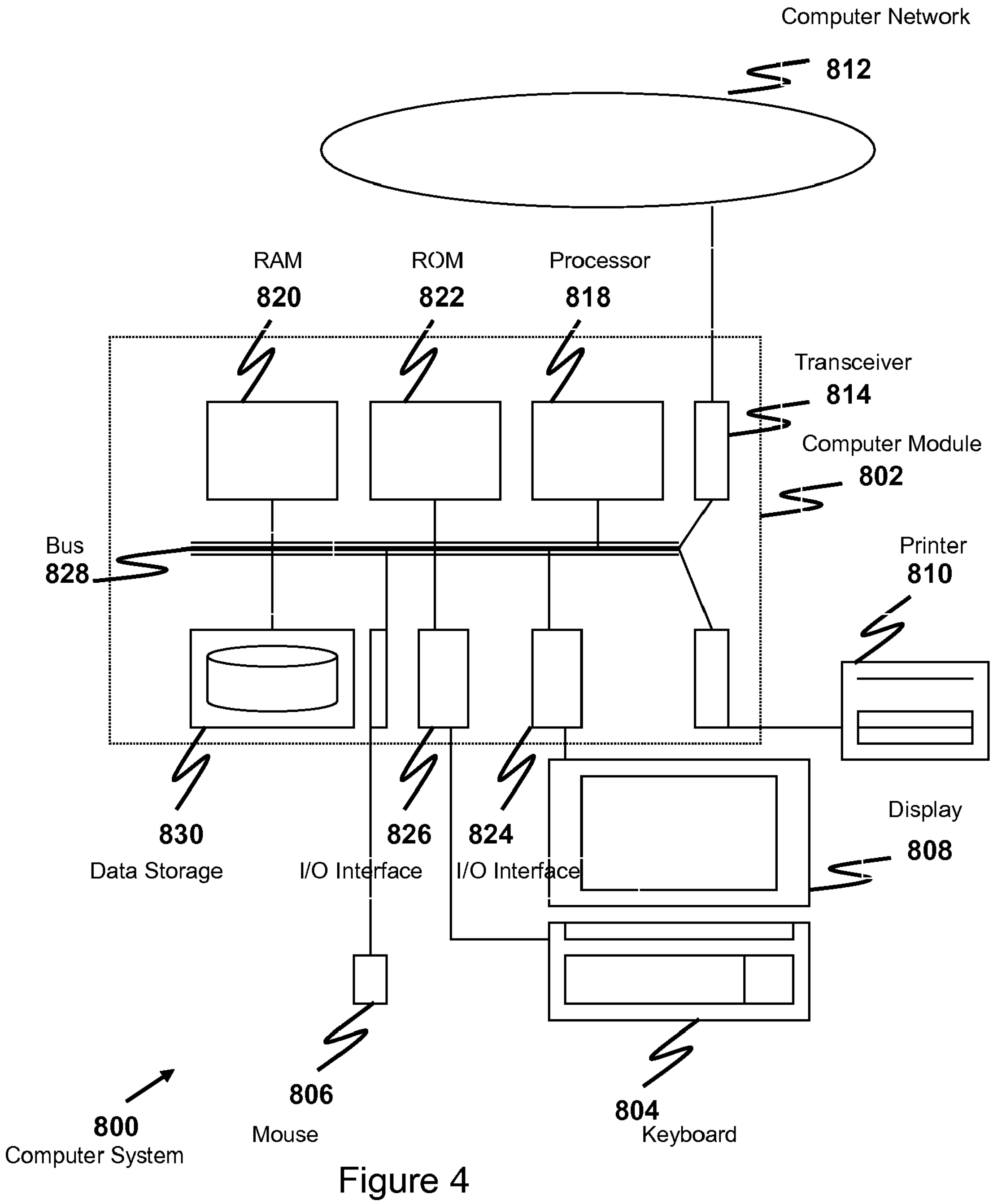
FIG. 4 illustrates a computer system in accord with a preferred embodiment of the invention.

The method and system of the example embodiment can be implemented on a computer system 800, schematically shown in FIG. 4. It may be implemented as software, such as a computer program being executed within the computer system 800, and instructing the computer system 800 to conduct the method of the example embodiment.

The computer system 800 comprises a computer module 802, input modules such as a keyboard 804 and mouse 806 and a plurality of output devices such as a display 808, and printer 810.

The computer module 802 is connected to a computer network 812 via a suitable transceiver device 814, to enable access to e.g. the Internet or other network systems such as Local Area Network (LAN) or Wide Area Network (WAN).

The computer module 802 in the example includes a processor 818, a Random Access Memory (RAM) 820 and a Read Only Memory (ROM) 822. The computer module 802 also includes a number of Input/Output (I/O) interfaces, for example I/O interface 824 to the display 808, and I/O interface 826 to the keyboard 804.

The components of the computer module 802 typically communicate via and interconnected bus 828 and in a manner known to the person skilled in the relevant art.

The application program is typically supplied to the user of the computer system 800 encoded on a data storage medium such as a CD-ROM or floppy disk and read utilising a corresponding data storage medium drive of a data storage device 830. The application program is read and controlled in its execution by the processor 818. Intermediate storage of program data maybe accomplished using RAM 820.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for use in the management of vehicle parking in a vehicle parking area having a plurality of vehicle parking spaces, the method comprising:

determining the locations of vacant vehicle parking spaces; and displaying the locations of vacant vehicle parking spaces to people seeking to park vehicles, wherein the step of determining the locations of vacant vehicle parking spaces comprises:

repeatedly capturing a sequence of images of pre-defined vehicle parking spaces;

processing the repeatedly captured sequence of images of the pre-defined vehicle parking spaces resulting in segmentation of the respective images into vehicle and non-vehicle objects; and identifying one or more features in the respective processed captured images, wherein the features are representative of a vehicle's presence.

2. The method according to claim 1, further comprising:

determining one or more identifying features of each of a plurality of vehicles located in vehicle parking spaces;

receiving a request to locate a specific vehicle with at least one of said one or more identifying features;

determining one or more possible locations for said specific vehicle based on said at least one of said one or more identifying features and the determined one or more identifying features of each of a plurality of vehicles; and displaying said one or more possible locations in response to said request.

3. The method according to claim 2, wherein said one or more features in the respective captured images comprise one or more of: the license/number plate, the colour, the make, the model , the shape, the size, or the contour of a vehicle.

4. A system for use in the management of vehicle parking in a vehicle parking area having a plurality of vehicle parking spaces, the system comprising:

one or more first detection units for determining the locations of vacant vehicle parking spaces; and one or more display units for displaying the locations of vacant vehicle parking spaces wherein each first detection unit comprises:

one or more camera elements for repeatedly capturing a sequence of images of predefined vehicle parking spaces, one or more image processing units for processing the repeatedly captured sequence of images obtained by the first detection unit resulting in segmentation of the respective images into vehicle and non-vehicle objects, and one or more processors for identifying one or more features in the respective processed captured images, wherein each of the features are representative of a vehicle's presence.

5. The system as claimed in claim 4, wherein each camera element is arranged such that cells of an image from the camera element are associated with one or more vehicle parking spaces, and the image processing units determines the location of the vacant vehicle spaces based on the individual cells of the images.

6. The system as claimed in claim 4, wherein each display unit comprises one or more audio display devices and/or one or more visual display devices.

7. The system as claimed in claim 4, wherein each display unit is arranged to communicate with one or more remote devices for facilitating displaying the locations of the vacant parking spaces.

8. The system as claimed in claim 7, wherein the remote devices comprise on-vehicle devices.

9. The system according to claim 4, further comprising:

one or more second detection units for determining one or more identifying features of each of a plurality of vehicles located in vehicle parking spaces; and one or more interface units for receiving a request to locate a specific vehicle with at least one of said one or more identifying features;

wherein each processor determines one or more possible locations for said specific vehicle based on said at least one of said one or more identifying features and the determined one or more features in the respective captured images; and a each display unit displays said one or more possible locations in response to said request.

10. The system as claimed in claim 9, wherein the first and second detection units are implemented in a single detection unit.

11. The system according to claim 4, wherein said one or more features in the respective captured images comprise one or more of: the license/number plate, the colour, the make, the model, the shape, the size, or the contour of a vehicle.

12. A computer readable data storage medium having stored thereon computer code means for instructing a computer to execute a method for use in the management of vehicle parking in a vehicle parking area having a plurality of vehicle parking spaces, the method comprising:

determining the locations of vacant vehicle parking spaces; and displaying the locations of vacant vehicle parking spaces, wherein the step of determining the locations of vacant vehicle parking spaces comprises:

repeatedly capturing a sequence of images of pre-defined vehicle parking spaces;

processing the repeatedly captured sequence of images of the pre-defined vehicle parking spaces resulting in segmentation of the respective images into vehicle and non-vehicle objects; and identifying one or more features in the respective processed captured images, wherein the features are representative of a vehicle's presence.

13. The method according to claim 1, wherein the captured images of the vehicle parking spaces are processed by an algorithm.

14. The method of claim 13, wherein the processing algorithm is an adaptive, a self-learning algorithm, or both.

15. The method according to claim 14, further comprising detecting one or more event status of the vehicle parking spaces based on the processing of the captured images.

16. The method according to claim 15, wherein the one or more event status include vacant, occupied, in-transit, toward, away, stop, no-human, human-towards, human-away, crowd towards, crowd away, or crowd-stop.

* * * * *